Patented Oct. 5, 1937

2,094,576

UNITED STATES PATENT OFFICE 2,094,576

GREASES

Maurice H. Arveson, Highland, Ind., assignor to Standard Oil Company, Chicago, Ill., a corporation of Indiana No Drawing. Application May 1, 1935, Serial No. 19,199

7 Claims. (Cl. 87—9)

This invention relates to greases and more particularly to a new type of grease which is highly resistant to attack by acids.

It is an object of my invention to produce a grease substantially free from soaps and other constituents which are attacked by acids. It is a further object of my invention to produce a grease having good lubricating qualities, good body, good thermal stability, a desirable tackiness and other valuable properties. Still further objects will become apparent as the description proceeds.

In the past it has been the almost universal practice to obtain the body necessary in a lubricating grease by the use of various types of soaps. Without exception these soaps are subject to acid attack and render the greases containing them unsuitable for service under conditions where they are likely to come into contact with acids which decompose the soap. Other materials, such as rubber, have been used to gain the necessary body but these materials are not highly inert chemically and are subject to deterioration which renders them unsatisfactory for acid service.

I have overcome these difficulties of the prior art by manufacturing greases consisting largely of an acid resistant mineral lubricating oil and an acid resistant plastic resin. An acid resistant filler, such as air-floated asbestos, may suitably be added. Soaps are not used. The greases made in accordance with my invention are not only practically completely acid-resistant under most conditions of service but also have other desirable properties which fit them for these and other uses.

The mineral lubricating oil constituent of my greases may have any desired viscosity within the lubricating oil range as in conventional grease practice. It may, for instance, have a viscosity of from 75 to 500 seconds Saybolt at 100° F. The oil should have a degree of acid resistance suitable for the use to which the grease is to be put. In some types of service an ordinary refined lubricating oil such as straw oil is completely satisfactory, but I prefer to use a highly refined oil such as a white oil or technical white oil since these products are produced by very severe acid treating and are therefore highly-acid-resistant. Another suitable type of acid-resistant mineral oil consists of synthetic products such as those made by the aluminum chloride polymerization of olefin hydrocarbons produced by the cracking of paraffin wax.

The resins used in my greases may be of various types. The principal feature desired is that of acid resistance. The molecular weight of the resin to be used should be high. Molecular weights of at least 1000 and preferably at least 2000 are desirable. Molecular weights of 2000 to 10,000 are preferred, although resins of higher molecular weight can also be used.

Furthermore, the resin should be plastic at ordinary temperatures and preferably at temperatures below 0° F.

The resin to be used should also be compatible with the mineral oil, that is, it should either be soluble in the mineral oil or should be capable of dispersion with mineral oil to give a homogeneous grease. Both from the standpoint of compatibility and from the standpoint of acid resistance, I prefer to use resins which are essentially hydrocarbon in nature. It will be understood, however, that in molecules of the size of those with which I am concerned one or several atoms of elements other than carbon and hydrogen may often be present without materially changing the essential hydrocarbon nature of the resin. In order to achieve the desired acid resistance it is important that the resin used should be substantially saturated. Thus, for example, rubber is unsaturated and is therefore unsatisfactory in my compositions while hydrogenated rubber which is essentially composed of saturated hydrocarbons, is quite satisfactory.

These resins can be produced in various ways from various materials by processes of polymerization, condensation and/or hydrogenation.

A preferred resin is made by the polymerization of isobutylene with aluminum chloride, or, preferably, boron trifluoride. In making this resin it is desirable to carry out the polymerization at a low temperature, for instance from +30° F. to —80° F. or less. The polymerization reaction may be carried out in the presence of a solvent, such as naphtha, which facilitates the incorporation of the resin in the oil. After incorporation the naphtha may be removed by distillation. Any synthetic oil made along with the resin may be utilized as a portion of the oil required in the final grease or may be removed from the resin by extraction with solvents such as propane or acetone-benzol, by vacuum distillation, etc.

Numerous other unsaturated hydrocarbons may be polymerized to make resins suitable for my purpose. Amongst these may be mentioned isohexene, cyclohexene, isoamylene and other mono-olefins. Resins may also be made from diolefins, such as butadiene, etc. If the resin produced by polymerization is not sufficiently acid-resistant, or, in other words, is not substantially saturated it may be hydrogenated to produce a resin satisfactory for the purpose. Thus, for example, in the case of resins produced from butadiene, the hydrogenation step is usually necessary.

I have previously mentioned the manufacture of a suitable resin by hydrogenation of rubber. To produce such a resin ordinary gum rubber may be dissolved in cyclohexane, decahydronaphthalene, or similar solvent and subjected to the action of hydrogen at about 3000 to 4000 pounds per square inch pressure in the presence of a suitable catalyst, for instance zinc chromite, preferably at a temperature of about 200 to 500° F.

The resin, by whatever means it may be produced, is incorporated with the mineral oil in any suitable type of mixing apparatus, preferably at an elevated temperature at which the resin is soft and easily worked.

The relative proportions of the mineral lubricating oil and resin will vary depending upon the particular resin chosen and the particular use to which the finished grease is to be put. It is to be understood, however, that the amount of resin to be used is usually rather large since the invention does not deal with the so-called thickened oils but rather with compositions having a grease structure. Thus, the minimum amount of resin will be that capable of giving a composition which will not flow readily under its own weight and which is classed with the greases rather than with the oils. As previously mentioned, this minimum amount will depend upon the particular resin chosen, but the minimum amount of resin expressed as a percentage of the total weight of oil and resin will usually be at least 10% and in most cases at least 20%. The maximum amount of resin on this same basis will be about 80% but the preferred range for the resin content is from about 30% to about 70% of the total weight of oil and resin. It is highly important to have a substantial amount of oil present since it tends to improve the lubricating qualities and reduce the toughness and tackiness of the resins which are usually too great for satisfactory use of these materials in the absence of oil.

While greases can be made without any constituent other than the oil and resin it is highly desirable to utilize some finely divided insoluble solid filler. This is usually important since the presence of the filler gives a firm structure for pressing into sticks, etc. and tends to retain the grease in place in the plug valve or other bearing surface in which it is used.

I have found that very finely divided asbestos is practically ideal as a filler. The best type of asbestos is the material separated from the coarser grades by air flotation and therefore known as air-floated asbestos. It is preferred to employ asbestos of sufficient fineness that 40% or more will pass a 200 mesh screen. This material gives a grease having a body highly superior to that which is obtained by the use of the ordinary grades of asbestos and the air-floated asbestos does not interfere with the working of the bearing surfaces as in the case of the ordinary grades. Asbestos is of course practically completely acid-resistant and therefore does not interfere with the acid-resistant characteristics of the grease. Other finely divided solids such as bentonite clay, precipitated barytes, graphite, mica, talc, sulfur, tellurium, selenium and precipitated metals, such as powdered antimony and bismuth and lead-copper alloys may be used.

The amount of finely divided solid filler to be used can be varied considerably. Expressed in terms of percentage of the total weight of oil and resin, the amount of filler may suitably be from 10% to 150% but amounts from 20% to 100% of the total oil and resin will usually be preferable.

As an example of my invention I have prepared lubricants from a hydrogenated rubber. The hydrogenated rubber itself was placed in the form of a film on tin and was exposed to concentrated sulfuric acid for sixty hours at room temperature. The resistance of this material to the acid was highly satisfactory, only slight discoloration being apparent. The edges of the hydrogenated rubber film had peeled off for a short distance but the center was well protected. The material was, however, too tough for use alone and its lubricating qualities were not satisfactory. It was therefore blended with a highly refined white lubricating oil having a viscosity of about 315 seconds Saybolt at 100° F. Compositions were made up containing 10%, 20%, 30%, 40%, 50%, 60%, 70%, 80%, 90% and 100% of this oil, the remainder of the composition being made up of the hydrogenated rubber. Each of these compositions was subjected to the sulfuric acid test previously described. The straight oil started to lift from the tin immediately and gave practically no protection to the metal. The compositions containing 70%, 80% and 90% oil did not start to lift for about one hour but the film tended to float to the edge of the tin surface and the compositions were not nearly as satisfactory as those containing 40%, 50% and 60% oil. The latter compositions were the most satisfactory of the series. The films did not tend to float and adhered very tenaciously to the surface, displaying all the characteristics desired in the case of a plug valve lubricant for acid service. The compositions containing 10%, 20% and 30% oil were, in general, more satisfactory than those containing 70%, 80% and 90%, but not as satisfactory as those containing 40%, 50% and 60% oil since the low oil content films were too tough and tended to turn up and separate from the metal at their edges.

The compositions of intermediate oil content were also more desirable from the standpoint of lubricating characteristics than those having lower oil contents and were more satisfactory from the standpoint of body, viscosity, tackiness, etc. than those of higher oil content.

It was found that a composition containing 35% air-floated asbestos and 65% of one of the above resin-oil mixtures of approximately equal oil and resin content made a highly satisfactory grease.

While I have described my invention in connection with certain specific embodiments thereof, numerous modifications within the spirit of my invention will occur to those skilled in the art and it is to be understood that my specific embodiments are by way of illustration rather than by way of limitation.

I claim:

1. An acid-resistant, metal-adherent, soap-free grease comprising as its essential ingredients, a mineral lubricating oil and an essentially hydrocarbon resin having a molecular weight of at least 1000, said resin comprising from 30% to about 70% of the total weight of said oil and said resin, and an oil-insoluble, very finely divided, fibrous, body-giving filler such as asbestos.

2. Grease according to claim 1 in which said filler is present in quantity of from about 20% to about 100% of the total weight of said oil and said resin.

3. Grease according to claim 1 in which said filler comprises air-floated asbestos of which at least 40% will pass a 200 mesh screen.

4. An acid-resistant, metal-adherent, tacky, soap-free grease comprising as its essential ingredients an acid-resistant mineral lubricating oil and a substantially saturated, essentially hydrocarbon resin of high molecular weight, produced by the polymerization of isobutylene, said resin comprising from 30% to about 70% of the total weight of said oil and said resin, said grease also comprising an oil-insoluble, acid-resistant finely divided fibrous filler.

5. An acid-resistant, metal-adherent, tacky, soap-free grease comprising as its essential ingredients, a mineral lubricating oil and an essentially hydrocarbon resin having a molecular weight of at least 1000 produced by the polymerization of isobutylene, said resin comprising from 30% to about 70% of the total weight of said oil and said resin, and an oil-insoluble, finely divided, fibrous, body-giving filler such as asbestos.

6. Grease according to claim 5 in which said filler comprises air-floated asbestos of which at least 40% will pass a 200 mesh screen.

7. Grease according to claim 5 in which said filler comprises air-floated asbestos, of which at least about 40% will pass a 200 mesh screen, and in which said filler is present in quantities of from about 20% to about 100% of the total weight of said oil and said resin.

MAURICE H. ARVESON.